Dec. 7, 1926.

F. M. ROBY 1,609,964

THREE-WAY VALVE

Filed Jan. 19, 1925          2 Sheets-Sheet 1

Inventor
Frank M. Roby
By Bates, Machlin, Goldrick & Teare
Attorneys

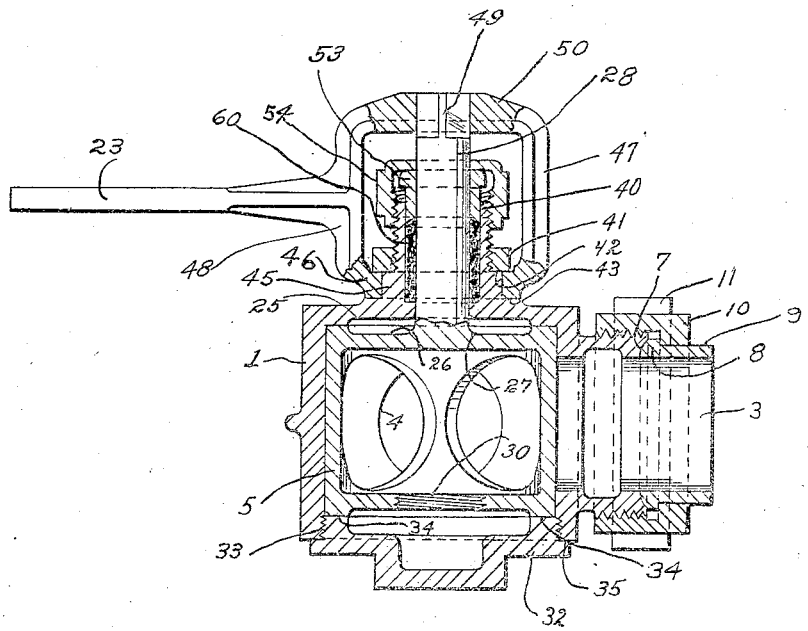
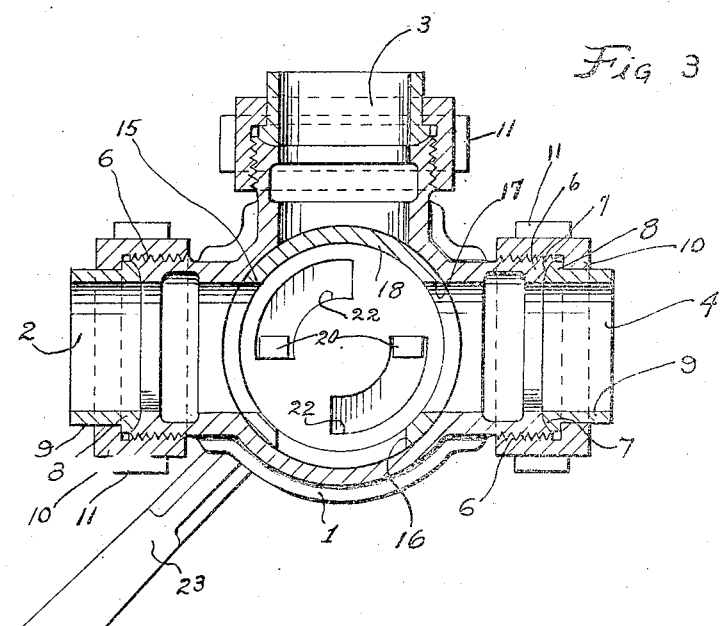

Patented Dec. 7, 1926.

1,609,964

UNITED STATES PATENT OFFICE.

FRANK M. ROBY, OF CLEVELAND, OHIO.

THREE-WAY VALVE.

Application filed January 19, 1925. Serial No. 3,300.

This invention relates to valve construction, and is particularly concerned with the arrangement of an operating handle for a valve such for instance as is shown, described and claimed in the patent to J. T. Talmage, No. 952,691, patented March 22, 1910.

An object of my invention is to provide a valve in which the movable member or plug is sealed against leakage at its stem, and wherein the manipulation of this stem may be effected to operate the valve without in any way disturbing the seal.

In carrying out my invention in connection with a valve having the usual hollow plug and an operating stem integrally formed therewith, a portion of which stem is surrounded by the usual packing gland and nut connection, I provide a handle for turning the stem which is formed with a two-point bearing so that it may be rigidly secured to the stem at one bearing and movably secured to the body of the valve at the other. By this means I am enabled to build a valve which will withstand side strains on the operating handle, the portion of the handle which engages the valve body effectively preventing undesirable bending of the stem which would otherwise result in a tendency to wear the bearing of the plug within the body.

Another object is to provide stops within the valve casing for limiting the movement of the valve plug. Further objects include the provision of a valve construction adapted to be easily manufactured, easily and quickly assembled and in which the movable parts are subjected to the least amount of wear or strain.

Certain other features of my invention will be set forth in the following description pertaining to the accompanying drawings and the essential characteristics will be summarized in the claims.

Figure 1:
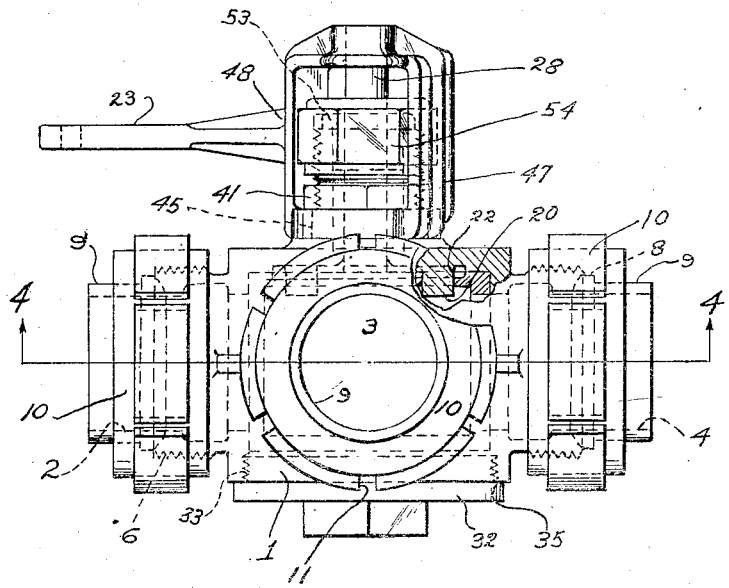
Figure 2:
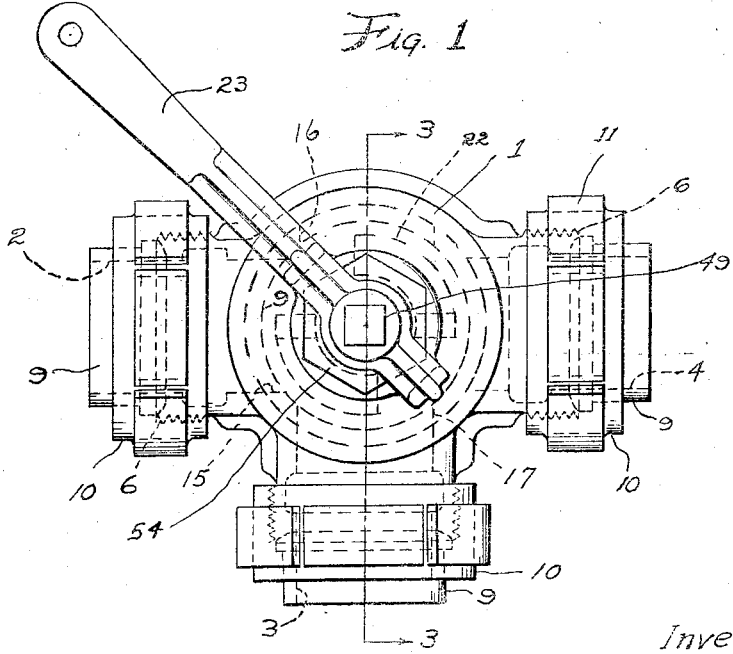

In the drawings, Fig. 1 is a side view of my valve broken away to show the position of one of the limit stops; Fig. 2 is a plan view thereof; Fig. 3 is a substantially central cross section indicated by the line 3—3 of Fig. 2; Fig. 4 is a cross section as indicated by the line 4—4 on Fig. 1.

I have shown the preferred form of my invention as adapted to a three-way valve wherein there are three branches and in which a hollow circular plug closes at least one of the branches at all times, whereby the flow of liquid admitted at one of the branches may be selectively directed to either of the other two. The plug is provided with an operating stem which extends through the usual packing gland and nut connection and which is surrounded by a tubular projection extending from the valve casing or body. This projection is preferably so formed at its base that it provides a bearing for an operating handle which may be held in place by a clamping nut threaded on said projection.

Referring to the various parts of my invention by reference characters, 1 indicates the valve body, 2, 3, and 4 the branches, and 5 the operating plug. The branches are formed preferably of threaded extensions 6 having their outermost faces 7 chamfered complementary to flanged nipples or sleeves 8. Each of the sleeves is provided with a barrel 9 which may be sweated to the ends of feed or delivery pipes or secured thereto in any suitable manner, the flanges being held against the chamfered faces of the extensions 6 by locking nuts 10. These I prefer to provide with separated segmental projections 11, adapted to be operated by the usual spanner wrench. The valve plug is preferably provided with circular openings 15, 16 and 17 which are shown in Figs. 2 and 4 in such position that a connection between the branches 2 and 4 is established, while a closed portion 18 of the valve plug closes the branch 3.

Lugs 20 projecting inwardly from the casing preferably occupy arcuate slots 22 in one of the flat walls of the plug to limit the movement thereof. With reference to Fig. 4 it will be seen that a 90° counter clockwise movement of an arm or handle designated 23, from the position shown will establish communication between the branches 3 and 4, while the branch 2 will be closed. The arrangement of placing the limit stops inside of the valve housing facilitates casting and protects the lugs from the likelihood of damage when in use. I prefer as far as possible, consistent with the efficient operation of the valve, to eliminate frictional resistance to the turning of the plug by removing metal at 25 and 26 from the casing and plug respectively which not only lightens the construction of the valve without materially decreasing its strength but also allows a generous fillet 27 to be retained at the base of the stem designated 28. The end of the plug opposite the stem may be closed or provided with an opening 30 threaded to receive a temporary insert (not shown) for facilitating the machining of the valve plug, and the valve casing may be effectively closed with a cap 32 threaded at 33 and lightly bearing against the plug at 34, the overhanging annular surface 35 forming a stop for preventing the cap from clamping the plug.

A threaded hollow extension 40 on the valve casing carries a nut 41 which lockingly seats at 42 against the top of a cylindrically formed portion 45. Rotatably supported by the cylindrical portion 45 and bearing against a flat annular face 43 on the casing I provide a ring 46 which forms part of the operating handle. The nut 41 provides an outer bearing face for the ring and the ring is connected to the arm of the handle and to an enlarged portion 50, which embraces angularly formed faces 49 on the stem 28, by suitably reinforced webs 47 and 48. A suitable packing gland 53 and nut 54 embrace the stem 28 in the usual manner and are positioned between the connected portions 46 and 50.

To assemble the valve the plug is first inserted into the open end of the casing with the stem projecting through the packing cavity. Suitable packing 60 is then placed in the cavity as shown. The handle, lock nut 41 and packing gland 53 and nut 54 are then placed over the stem and the two nuts then screwed into place. The lock nut securely holds the handle in free turning position and the other effects a tight and adjustable seal against leakage.

It will be seen that by this arrangement I have provided a valve construction wherein the packing lends itself to easy adjustment without necessitating the removal of the handle, and at the same time there is little or no likelihood of the valve plug resisting rotation due to swelling or other distortion of the packing. Moreover, I have provided a simple means for securely locking the handle to the valve plug, which is so arranged upon the packing shell that it will not interfere with the adjustment of the packing. It is to be noted that by reason of using about the amount of packing shown, the distance between the two nuts is less than the length of the ring 46; therefore, should the locking nut 41 become loosened, when the valve is in use, there is no likelihood of the handle coming entirely off since the outer end surface of this nut would merely lock against the packing nut and nothing more serious would result than an immaterial longitudinal play of the pivot-end of the handle between the casing and the locking nut.

By reason of the length of the cylindrical portion 45 of the extension 40 being slightly greater than the attaching ring 46 there is never a tendency to bind the handle against rotation. Moreover any likelihood of bending or disaligning the valve stem 28 and thus decreasing the efficiency of the packing is prevented by the overhanging flange formed by the nut 41 bearing snugly upon an attaching portion 46 of the handle.

Having thus described my invention, I claim:

1. In a valve the combination of a casing, having inlet and outlet openings, a plug within the casing adapted to open or close one of said openings, a valve stem projecting through the casing, an extension rising from the casing and surrounding the stem, a handle having a yoke, one arm of which embraces the extension and is movable relatively thereto and the other arm of which operatively embraces the stem.

2. In a valve the combination of a casing, inlet and outlet branches therefor, a plug within the casing adapted to open or close said branches, a valve stem projecting through the casing, an extension rising from the casing and surrounding the stem, a packing device for the stem associated with the extension, and a handle having a yoke one arm of which embraces the extension below said device and the other arm of which is operatively secured to the valve stem above the device to turn the plug.

3. In combination a valve casing, inlet and outlet branches therefor, a hollow plug removably secured within the casing, an aperture within the plug adapted to open communication between said inlet and outlet branches when the plug is rotated through a given angle, a stem extending from the plug through a wall of the casing, a handle member provided in effect with two mutually rigid arms, means surrounding the stem and secured to the casing for movably securing one of the arms to the casing and means for preventing relative rotation between the stem and the other arm, said securing means for the first arm serving to maintain the engagement between the second arm and the stem.

4. In combination a valve casing, inlet and outlet branches therefor, a hollow plug removably secured within the casing, apertures within the plug communicating with certain of said inlet and outlet branches when the plug is rotated through a given angle a stem for the plug extending outwardly of the casing, an externally threaded packing sleeve surrounding said stem and having a shoulder, a handle member having a bearing portion and a portion operatively associated with said stem, means including a nut arranged to abut said shoulder for movably securing the bearing portion to the casing, and means for preventing relative rotation between the stem and handle.

5. A valve comprising a casing, branch openings formed within the casing, a movable plug adapted to be moved to open or close said branch openings, means for retaining the plug in the casing, a stem projecting from the plug, a hollow member extending from the casing and surrounding the stem, sealing means for said stem within said hollow member, a nut and gland for compressing said sealing means, a locking nut beneath said first named nut, a bifurcated handle for turning the plug, one arm of said handle being operatively secured to the plug stem and the other arm movably secured to said hollow member and retained thereon by said locking nut.

6. A valve construction comprising in combination a valve casing having inlet and outlet branches, a hollow movable plug removably secured in the casing and having an opening communicating with certain of the inlet and outlet branches, an arcuate slot in one end of the plug, opening into the interior of the plug, a projection extending into the slot from the casing and means projecting through the casing for turning the plug.

7. A valve construction comprising in combination a valve casing having inlet and outlet branches, a turnable plug removably secured in the casing and arranged to establish communication between the branches, a stem projecting through a wall of the casing for turning the plug, a sleeve surrounding the stem and having a cylindrical bearing surface, a handle operatively associated with the stem and having a member embracing the bearing surface, said sleeve being threaded adjacent the cylindrical surface, and a retaining member engaging the threads adjacent said member of the handle.

8. In combination a valve casing having inlet and outlet branches, a valve plug located in the casing, an opening in the plug arranged to establish communication between said branches, a stem extending from the plug through the wall of the casing, a packing sleeve having a cylindrical portion and an externally threaded portion, a handle member engaging said cylindrical portion as a bearing, means including a nut for securing the handle member thereon, and means including a packing nut engaging said threaded portion of the sleeve for preventing the accidental removal of said first named nut and the handle.

9. In a valve a casing, a valve plug having a stem, a handle member having a bearing portion embracing a portion of the casing, a member surrounding the stem and in threaded engagement with the casing for preventing the removal of the handle, said handle having a portion thereof operatively associated with the stem to turn the plug.

10. In a valve, a casing and a plug adapted to turn therein having a stem projecting outwardly through the casing wall, an externally threaded packing sleeve surrounding the stem, a handle operatively associated with the stem to turn the plug and having a bearing portion freely embracing said sleeve, a member on the sleeve for retaining the bearing portion against endwise movement and a packing nut engaging the threads on said sleeve, said nut serving to prevent the accidental removal of the retaining member and handle.

11. In combination with a valve having a casing and a stem projecting therefrom, a handle having a bearing member embracing a portion of the valve casing, and a member engaging the stem to turn the same, oppositely disposed connecting members extending between the said handle members to form a rigid structure and an arm extending laterally with reference to the stem from one of the said connecting members.

In testimony whereof, I hereunto affix my signature.

FRANK M. ROBY.